(12) United States Patent
Oh et al.

(10) Patent No.: US 12,214,317 B2
(45) Date of Patent: Feb. 4, 2025

(54) MEMBRANE HUMIDIFIER FOR FUEL CELL, COMPRISING MULTI-CHANNEL HOLLOW FIBER MEMBRANES

(71) Applicant: KOLON INDUSTRIES, INC., Seoul (KR)

(72) Inventors: Young Seok Oh, Seoul (KR); Kyoung Ju Kim, Seoul (KR); Woong Jeon Ahn, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 572 days.

(21) Appl. No.: 17/417,767

(22) PCT Filed: Dec. 20, 2019

(86) PCT No.: PCT/KR2019/018168
§ 371 (c)(1),
(2) Date: Jun. 24, 2021

(87) PCT Pub. No.: WO2020/138852
PCT Pub. Date: Jul. 2, 2020

(65) Prior Publication Data
US 2022/0013797 A1 Jan. 13, 2022

(30) Foreign Application Priority Data
Dec. 27, 2018 (KR) .......................... 10-2018-0171120

(51) Int. Cl.
*B01D 63/00* (2006.01)
*B01D 63/02* (2006.01)
(Continued)

(52) U.S. Cl.
CPC .......... *B01D 63/033* (2022.08); *B01D 63/04* (2013.01); *B01D 69/081* (2013.01); *H01M 8/04149* (2013.01); *B01D 69/082* (2013.01)

(58) Field of Classification Search
CPC .............. H01M 8/04149; B01D 63/02; B01D 63/04; B01D 69/081; B01D 63/031; Y02E 60/50
See application file for complete search history.

(56) References Cited

U.S. PATENT DOCUMENTS 5,454,947 A * 10/1995 Olapinski .............. B01D 29/52
210/500.26
5,607,586 A * 3/1997 Grangeon ............ B01D 63/066
96/9
(Continued)

FOREIGN PATENT DOCUMENTS

CN 101174702 A 5/2008
CN 201220152 Y 4/2009
(Continued)

OTHER PUBLICATIONS

Epo translation of KR20140099753 (Year: 2014).*
(Continued)

*Primary Examiner* — Stephen Hobson
(74) *Attorney, Agent, or Firm* — Harvest IP Law, LLP

(57) ABSTRACT

Disclosed is a membrane humidifier for a fuel cell, comprising multi-channel hollow fiber membranes having a plurality of channels in various sizes, thus allowing humidifying performance to be maintained in the case of a high rate of flow and to be decreased in the case of a low rate of flow, and thereby preventing flooding. The membrane humidifier for a fuel cell, according to the present invention, comprises: a middle case in which a plurality of hollow fiber membranes are accommodated; a cap case coupled to the middle case; and a fixing unit in which ends of the plurality of hollow fiber membranes are potted, wherein a plurality of channels are formed in each of the hollow fiber membranes, and the difference between the biggest and smallest inner diameters among the inner diameters of the plurality of channels is 30-600 μm.

5 Claims, 4 Drawing Sheets

(51) Int. Cl.
   *B01D 63/04* (2006.01)
   *B01D 69/08* (2006.01)
   *H01M 8/04119* (2016.01)

(56) References Cited

U.S. PATENT DOCUMENTS

| | | | | |
|---|---|---|---|---|
| 5,716,526 | A * | 2/1998 | Kelemen | B01D 61/145 |
| | | | | 436/829 |
| 6,077,436 | A * | 6/2000 | Rajnik | B01D 63/066 |
| | | | | 210/321.82 |
| 6,423,537 | B1 * | 7/2002 | Soria | C04B 35/62227 |
| | | | | 96/10 |
| 7,938,876 | B2 * | 5/2011 | Liu | C04B 35/195 |
| | | | | 60/311 |
| 11,646,431 | B2 * | 5/2023 | Kim | H01M 8/2484 |
| | | | | 261/105 |
| 2001/0015500 | A1 * | 8/2001 | Shimanuki | B01F 23/21 |
| | | | | 261/104 |
| 2001/0021468 | A1 * | 9/2001 | Kanai | H01M 8/04156 |
| | | | | 429/414 |
| 2002/0098395 | A1 * | 7/2002 | Shimanuki | H01M 8/04149 |
| | | | | 429/414 |
| 2004/0076874 | A1 * | 4/2004 | Nickel | B01D 63/062 |
| | | | | 429/104 |
| 2009/0305871 | A1 * | 12/2009 | Perera | D01D 5/24 |
| | | | | 425/464 |
| 2012/0282533 | A1 * | 11/2012 | Kim | B01D 63/02 |
| | | | | 429/413 |
| 2013/0065140 | A1 * | 3/2013 | Kim | B01D 63/04 |
| | | | | 429/413 |
| 2013/0256214 | A1 * | 10/2013 | Dahlberg | B01D 69/082 |
| | | | | 264/180 |
| 2016/0137557 | A1 * | 5/2016 | Gu | B01D 67/00411 |
| | | | | 210/500.23 |
| 2016/0214064 | A1 * | 7/2016 | Gu | B01D 67/0051 |
| 2016/0288058 | A1 * | 10/2016 | Tai | B01D 69/085 |
| 2017/0077531 | A1 * | 3/2017 | Kim | B01F 23/20 |
| 2017/0144938 | A1 * | 5/2017 | Li | C04B 38/00 |
| 2017/0263945 | A1 * | 9/2017 | Li | H01M 8/0239 |
| 2018/0147534 | A1 * | 5/2018 | Lescoche | B01D 63/027 |
| 2023/0381303 | A1 * | 11/2023 | Drummond | A61K 47/28 |

FOREIGN PATENT DOCUMENTS

| | | | | |
|---|---|---|---|---|
| CN | 101527364 | A | | 9/2009 |
| CN | 102553441 | A | | 7/2012 |
| CN | 102648547 | A | | 8/2012 |
| CN | 103000919 | A | | 3/2013 |
| CN | 105749764 | A * | | 7/2016 |
| CN | 105879687 | A * | 8/2016 | B01D 63/02 |
| CN | 110767923 | A * | | 2/2020 |
| EP | 2992038 | A2 | | 11/2014 |
| JP | 2001201120 | A | | 7/2001 |
| JP | 2001202979 | A | | 7/2001 |
| JP | 2017196556 | A | | 11/2017 |
| KR | 100750289 | B1 | | 8/2007 |
| KR | 20100125553 | A | | 12/2010 |
| KR | 20110060048 | A | | 6/2011 |
| KR | 20130029306 | A | | 3/2013 |
| KR | 20140099753 | * | | 8/2014 |
| KR | 20140099753 | A | | 8/2014 |
| WO | WO-2006012920 | A1 * | 2/2006 | B01D 63/02 |
| WO | WO-2012025168 | A1 * | 3/2012 | B01D 63/066 |
| WO | 2018086343 | A1 | | 5/2018 |

OTHER PUBLICATIONS

Suez: "Water Technologies & Solutions fact sheet Zeeweed ZW 700B".
EP search report dated Apr. 4, 2022.
Office action dated Jul. 4, 2022 related to the corresponding Chinese Patent application.
KR Office action dated Nov. 13, 2021.

* cited by examiner

MEMBRANE HUMIDIFIER FOR FUEL CELL, COMPRISING MULTI-CHANNEL HOLLOW FIBER MEMBRANES

CROSS REFERENCE TO RELATED APPLICATIONS

This application is a National Stage of International Application No. PCT/KR2019/018168 filed Dec. 20, 2019, claiming priority based on Korean Patent Application No. 10-2018-0171120 filed Dec. 27, 2018.

TECHNICAL FIELD

The present disclosure relates to a membrane humidifier for a fuel cell including a multi-channel hollow fiber membrane, and more particularly to a membrane humidifier for a fuel cell including a multi-channel hollow fiber membrane having a plurality of various-sized channels such that humidification performance is maintained in a high flow rate state and the humidification performance is reduced in a low flow rate state, whereby it is possible to prevent flooding.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, in the case in which the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a humidification membrane method of supplying moisture to a gas fluid bed using a polymer separation membrane are used as methods of humidifying the polymer electrolyte membrane or the proton exchange membrane.

Among these methods, the humidification membrane method, which provides water vapor to a gas that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

In the case in which a module is formed, a hollow fiber membrane having large transmission area per unit volume is suitable for the permselective membrane used in the humidification membrane method. That is, in the case in which a membrane humidifier is manufactured using a hollow fiber membrane, high integration of the hollow fiber membrane having large contact surface area is possible, whereby it is possible to sufficiently humidify a fuel cell even in the case of a small capacity, it is possible to use a low-priced material, and it is possible to collect moisture and heat included in off-gas discharged from the fuel cell at a high temperature and to reuse the collected moisture and heat through the humidifier.

The membrane humidifier supplies moisture to a fuel cell stack to assist the stack in smoothly producing electricity. In the case in which an excessive amount of moisture is supplied in a low flow rate state, the moisture may be condensed, whereby a flow passage in the stack may be clogged, and therefore a portion of the stack may be deteriorated.

Therefore, it is necessary to supply a large amount of moisture in a high flow rate period requiring a large amount of moisture and to supply a small amount of moisture in a low flow rate period requiring a small amount of moisture.

Related Patent Documents

1. Korean Registered Patent No. 10-0750289
2. Korean Registered Patent No. 10-1848817

DISCLOSURE

Technical Problem

It is an object of the present disclosure to provide a membrane humidifier for a fuel cell including a multi-channel hollow fiber membrane having a plurality of various-sized channels such that humidification performance is maintained in a high flow rate state and the humidification performance is reduced in a low flow rate state, whereby it is possible to prevent flooding.

Technical Solution

In accordance with an aspect of the present disclosure, there is provided a membrane humidifier for a fuel cell, the membrane humidifier including a middle case in which a plurality of hollow fiber membranes are accommodated, a cap case coupled to the middle case, and a fixing unit in which ends of the plurality of hollow fiber membranes are potted, wherein each of the hollow fiber membranes has a plurality of channels formed therein, and the difference between the maximum and minimum inner diameters among the inner diameters of the plurality of channels is 30 to 600 µm.

Each of the hollow fiber membranes may have an outer diameter of 1000 to 5000 µm.

Each of the plurality of channels may have an inner diameter of 300 to 1300 µm.

The shortest distances between the outer circumferential surface of each of the hollow fiber membranes and the channels thereof may be 60 to 500 µm.

The sum of sectional areas of the plurality of channels of each of the hollow fiber membranes may be 40 to 90% of the sectional area of the hollow fiber membrane.

Advantageous Effects

According to the present disclosure, hollow fiber membranes each having a plurality of various-sized channels are applied to a membrane humidifier for a fuel cell such that, in a low flow rate period, a fluid flows only through the large-sized channels due to differential pressure, whereby moisture transfer efficiency is lowered and thus flooding is prevented, and in a high flow rate period, both the large-sized channels and the small-sized channels are used for the moisture transfer, whereby sufficient moisture transfer is achieved.

In addition, a plurality of channels are formed in each of the hollow fiber membranes, whereby the thickness of the hollow fiber membrane may be greater than the thickness of a hollow fiber membrane having a single channel formed therein, and therefore strength and durability of the hollow fiber membrane may be improved.

BEST MODE

Figure 1:
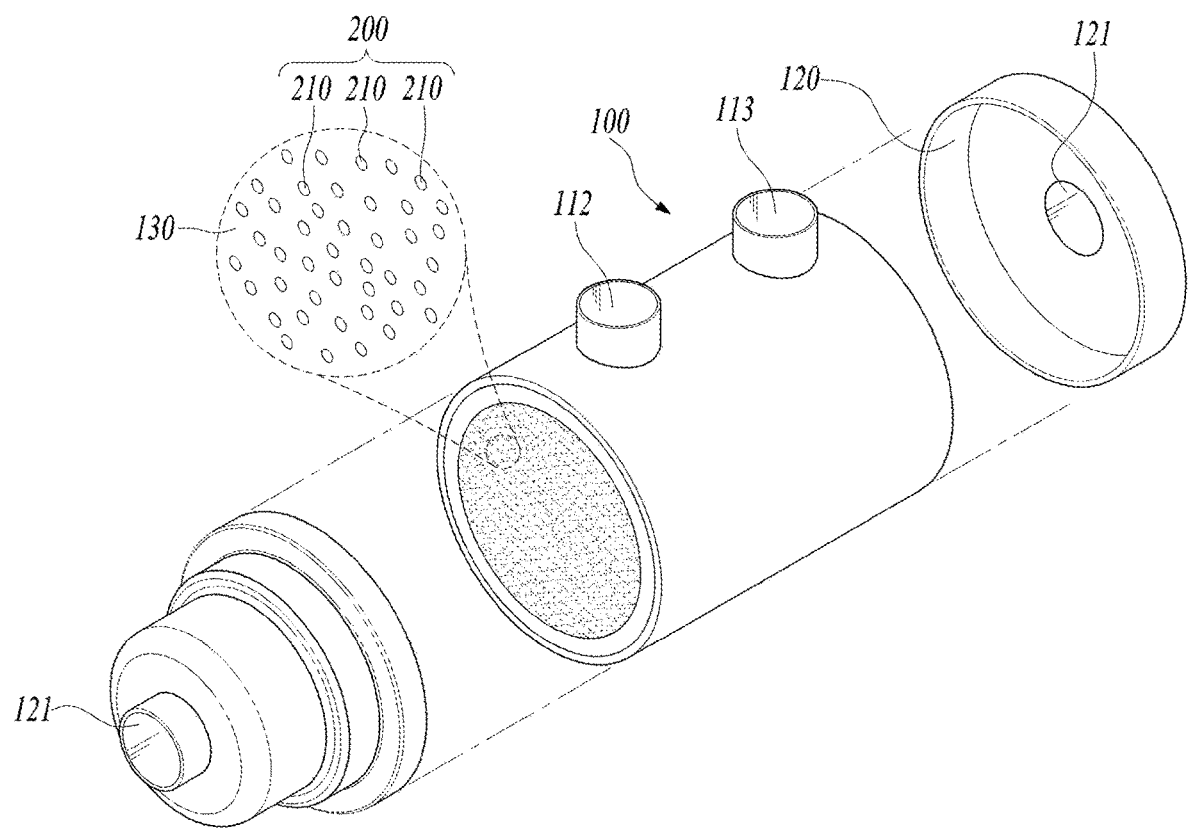
FIG. 1 is an exploded perspective view of a membrane humidifier for a fuel cell according to an embodiment of the present disclosure.
Figure 2:
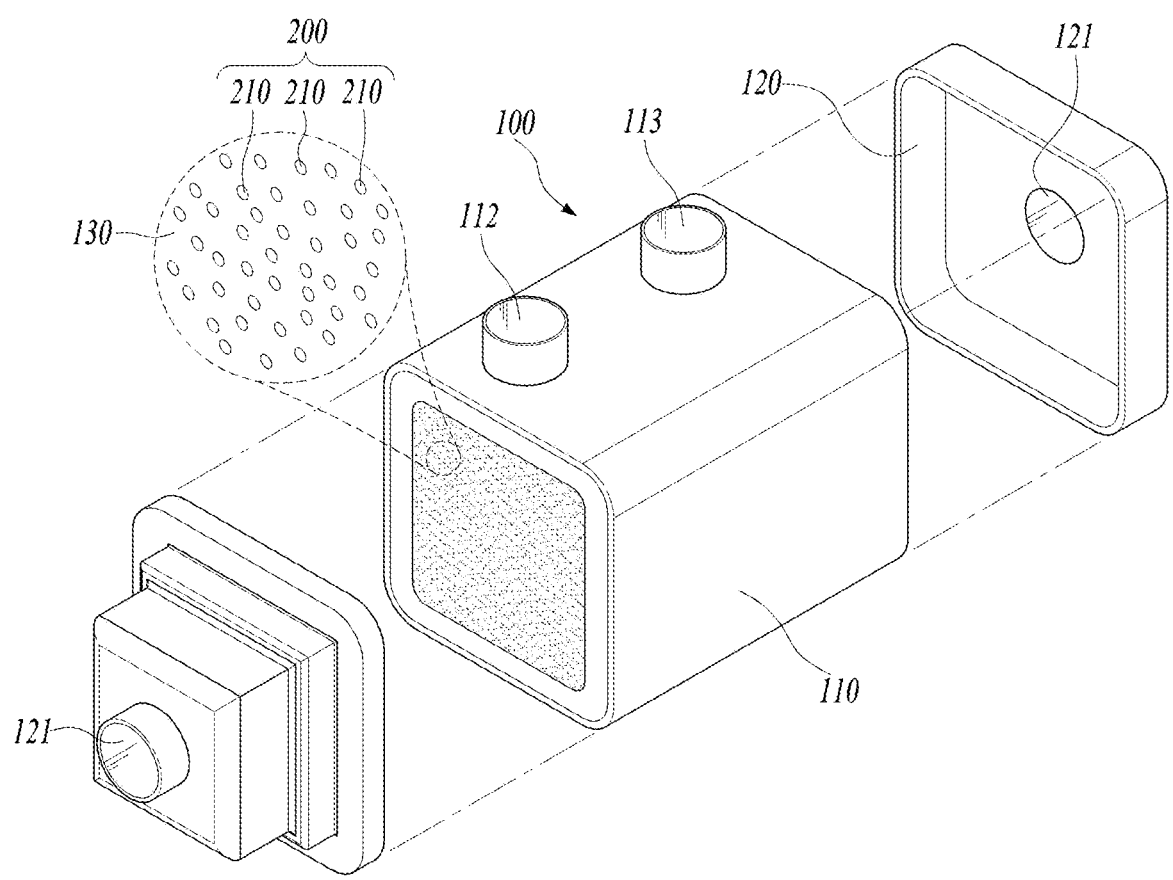
FIG. 2 is an exploded perspective view of a membrane humidifier for a fuel cell according to another embodiment of the present disclosure.

As shown in FIGS. 1 and 2, a membrane humidifier 100 for a fuel cell according to the present disclosure includes a middle case 110, a cap case 120, a fixing unit 130, and a hollow fiber membrane bundle 200.

The middle case 110 is coupled to the cap case 120 to define the external appearance of the membrane humidifier 100. Each of the middle case 110 and the cap case 120 may be made of hard plastic, such as polycarbonate, or metal. The lateral sectional shape of each of the middle case 110 and the cap case 120 may be a circle, as shown in FIG. 1, or the lateral sectional shape thereof may be a polygon, as shown in FIG. 2. The polygon may be a rectangle, a square, a trapezoid, a parallelogram, a pentagon, or a hexagon, and corners of the polygon may be round. In addition, the circle may be an oval.

The middle case 110 is provided with a second fluid inlet 112, through which a second fluid is introduced, and a second fluid outlet 113, through which the second fluid is discharged.

In FIGS. 1 and 2, a plurality of hollow fiber membranes 210 are illustrated as being disposed in the middle case 110 in the form of a single hollow fiber membrane bundle 200. Alternatively, the hollow fiber membranes 210 may be separately accommodated in two or more cartridges which are inserted in the middle case 110.

The cap case 120 is provided with a fluid inlet/outlet port 121. The fluid inlet/outlet port 121 formed in one of the cap cases 120 respectively coupled to opposite ends of the middle case 110 is a first fluid inlet, and the fluid inlet/outlet 121 formed in the other cap case is a first fluid outlet. A first fluid introduced through the fluid inlet/outlet port 121 that functions as the first fluid inlet passes through inner pipelines (i.e. lumens) of the hollow fiber membranes 210 accommodated in the middle case 110 and is then discharged outside through the fluid inlet/outlet port 121 that functions as the first fluid outlet.

The hollow fiber membrane 210 may be formed of, for example, Nafion, polyetherimide, polyimide (PI), polyphenylsulfone, polysulfone (PS), polyethersulfone (PES), or a mixture of two or more thereof.

Ends of the hollow fiber membranes 210 are potted in the fixing unit 130. The fixing unit 130 fills the gaps between the hollow fiber membranes 210 and gaps between the hollow fiber membranes 210 and the middle case 110 while binding the hollow fiber membranes 210 to each other. As a result, each of the opposite ends of the middle case 110 is blocked by the fixing unit 130, whereby a flow passage configured to allow the second fluid to pass therethrough is defined therein. The fixing unit 130 is made of a known material, and a detailed description thereof will be omitted from this description.

Figure 3:
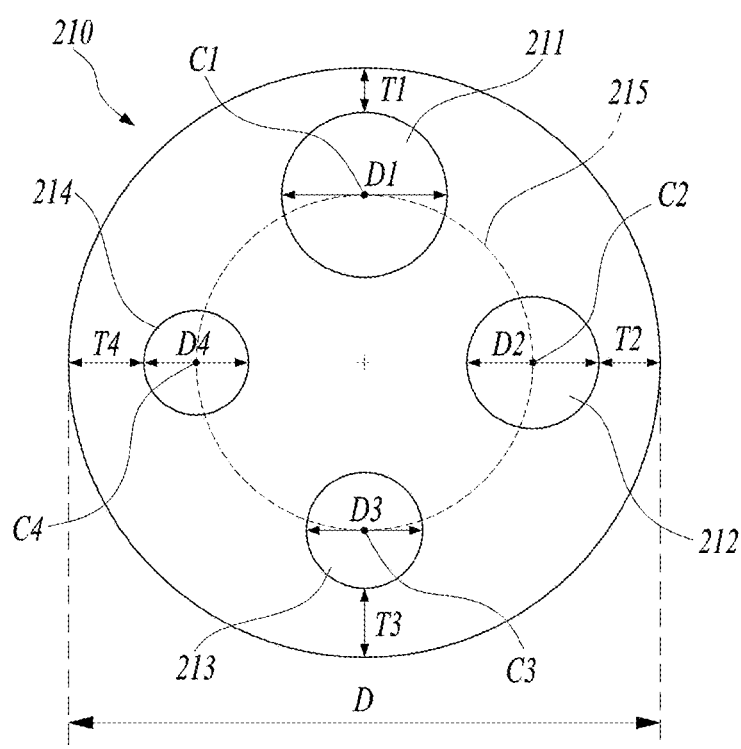
FIG. 3 is a sectional view of a hollow fiber membrane according to an embodiment of the present disclosure.
Figure 4:
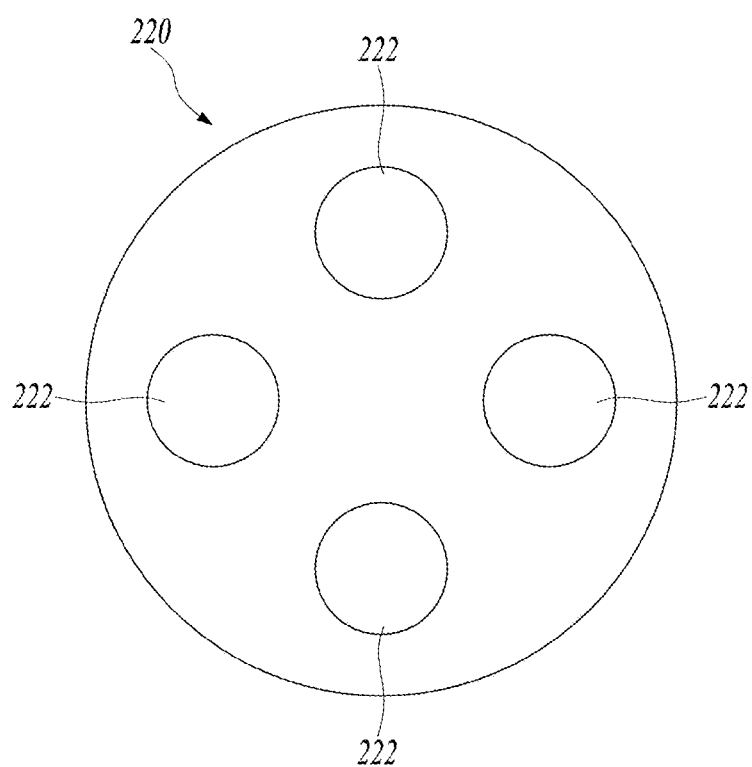
FIG. 4 is a sectional view of a hollow fiber membrane according to Comparative Example.

FIG. 3 is a sectional view of a hollow fiber membrane 210 according to an embodiment of the present disclosure, and FIG. 4 is a sectional view of a hollow fiber membrane 220 according to Comparative Example.

According to the present invention, a plurality of channels 211, 212, 213, and 214 are formed in the hollow fiber membrane 210, and the difference between the maximum inner diameter D1 and the minimum inner diameter D4, among the inner diameters D1, D2, D3, and D4 of the plurality of channels 211, 212, 213, and 214, is 30 to 600 µm.

That is, according to the present invention, at least one of the plurality of channels 211, 212, 213, and 214 has an inner diameter different from the inner diameter(s) of the other channel(s), and such inner diameter difference is 30 to 600 µm.

As illustrated in FIG. 3, the hollow fiber membrane 210 according to an embodiment of the present disclosure may have four channels 211, 212, 213, and 214 having different sizes. The number of channels formed in the hollow fiber membrane 210 is not limited to 4, and 2 to 12 channels may be formed in the hollow fiber membrane. Even when different number of channels are formed, at least one of the plurality of channels has an inner diameter different from the inner diameter(s) of the other channel(s), and such inner diameter difference is 30 to 600 µm as described above. For example, the plurality of channels of the hollow fiber membrane may include two channels having a relatively large first inner diameter and two channels having a relatively small second inner diameter, and the difference between the first inner diameter and the second inner diameter may be 30 to 600 µm.

As illustrated in FIG. 3, the plurality of channels of the hollow fiber membrane 210 may include a largest first channel 211, a second channel 212 smaller than the first channel 211, a third channel 213 smaller than the second channel 212, and a fourth channel 214 smaller than the third channel 213. In other words, all of the channels 211, 212, 213, and 214 may be formed so as to have different inner diameters.

The centers C1, C2, C3, and C4 of the channels 211, 212, 213, and 214 may be arranged at the same distance from the center of the hollow fiber membrane 210, whereby the centers C1, C2, C3, and C4 may be arranged on an hypothetical circle 215 having a center that coincides with the center of the hollow fiber membrane 210. Alternatively, the plurality of channels 211, 212, 213, and 214 may be randomly arranged in the hollow fiber membrane 210 such that not all the centers C1, C2, C3, and C4 thereof are arranged on a hypothetical circle 215 which shares a center with the hollow fiber membrane 210.

The plurality of channels 211, 212, 213, and 214 may be arranged in the hollow fiber membrane 210 such that thicknesses T1, T2, T3, and T4, which are the shortest distances between the outer circumferential surface of the hollow fiber membrane 210 and the channels 211, 212, 213, and 214, are equal to each other or different from each other.

In the case in which the centers C1, C2, C3, and C4 of the channels 211, 212, 213, and 214 are arranged at the same distance from the center of the hollow fiber membrane 210, at least one of the thicknesses T1, T2, T3, and T4 is likely to be too large, since the difference between the inner diameters of the channels 211, 212, 213, and 214 is at least 30 μm, and thus humidification performance of the hollow fiber membrane may be reduced.

Accordingly, in view of humidification performance of the hollow fiber membrane 210, it is preferable for the channels 211, 212, 213, and 214 to be formed in the hollow fiber membrane 210 such that the thicknesses T1, T2, T3, and T4 respectively corresponding to the channels 211, 212, 213, and 214 are not excessively large. For example, the shortest distances (i.e. the thicknesses) T1, T2, T3, and T4 between the outer circumferential surface of the hollow fiber membrane 210 and the channels 211, 212, 213, and 214 may be 60 to 500 μm.

In addition, the channels 211, 212, 213, and 214 may be arranged in the hollow fiber membrane 210 such that hypothetical segments that link each of the centers C1, C2, C3, and C4 of the channels 211, 212, 213, and 214 and the center of the hollow fiber membrane 210 form right angles therebetween. However, the present disclosure is not limited thereto. The hypothetical segments may not form right angles therebetween as long as the channels 211, 212, 213, and 214 are arranged so as to be spaced apart from each other by a predetermined distance.

The hollow fiber membrane 210 may have an outer diameter of 1000 to 5000 μm. The hollow fiber membrane 210 of the present invention having the plurality of channels 211, 212, 213, and 214 may be formed so as to have an outer diameter twice or more that of a hollow fiber membrane having only a single channel formed therein.

The plurality of channels 211, 212, 213, and 214 may have inner diameters D1, D2, D3, and D4 of 300 to 1300 μm. The larger the outer diameter of the hollow fiber membrane 210 is, the larger the inner diameters D1, D2, D3, and D4 of the channels 211, 212, 213, and 214 would be. For example, in the case in which the outer diameter of the hollow fiber membrane 210 is 2300 μm, the channels 211, 212, 213, and 214 may have inner diameters D1, D2, D3, and D4 of 900 μm, 800 μm, 700 μm, and 600 μm, respectively.

The shortest distances (i.e. the thicknesses) T1, T2, T3, and T4 between the outer circumferential surface of the hollow fiber membrane 210 and the channels 211, 212, 213, and 214 may be 60 to 500 μm.

In the case in which any one of the thicknesses T1, T2, T3, and T4 is less than 60 μm, the hollow fiber membrane would be vulnerable to a damage caused due to pressure. In the case in which any one of the thicknesses T1, T2, T3, and T4 is greater than 500 μm, humidification performance of the hollow fiber membrane 210 is likely to be reduced.

In the case in which the inner diameters of the channels are relatively small and the number of channels is large, a portion of the channels may be formed in the central portion of the hollow fiber membrane 210 as well.

The sum of the sectional areas of the plurality of channels 211, 212, 213, and 214 may be 40 to 90% of the sectional area of the hollow fiber membrane 210. In the case in which the outer diameter of the hollow fiber membrane 210 is 2300 μm and the channels 211, 212, 213, and 214 have inner diameters D1, D2, D3, and D4 of 900 μm, 800 μm, 700 μm, and 600 μm, respectively, the sum of the sectional areas of the plurality of channels 211, 212, 213, and 214 is about 43.5% of the sectional area of the hollow fiber membrane 210.

The sectional area ratio may be increased as the number of channels having relatively small inner diameters is increased.

Hereinafter, a method of manufacturing the hollow fiber membrane 210 will be described.

The hollow fiber membrane 210 may be formed by extruding a spinning solution through a nozzle. A nozzle having a spinning hole therein corresponding to the hollow fiber membrane 210 shown in FIG. 3 is used.

The spinning solution includes a polymer, an additive, and a solvent.

The polymer may be any one selected from the group consisting of polyvinylidene fluoride (PVDF), polyacrylonitrile, a polyacrylonitrile copolymer, polysulfone, sulfonated polysulfone, polyethersulfone, cellulose acetate, cellulose triacetate, polymethyl methacrylate, and a mixture of two or more thereof.

The additive may be any one selected from the group consisting of water, methyl alcohol, ethyl alcohol, ethylene glycol, polyethylene glycol, polypropylene glycol, glycerine, polyvinyl pyrrolidone (PVP), and a mixture of two or more thereof.

The solvent may be any one selected from the group consisting of N-methyl-2-pyrrolidone (NMP), dimethyl formamide (DMF), dimethyl acetamide (DMAc), chloroform, tetrahydrofuran, and a mixture of two or more thereof.

The spinning solution may be extruded through a plurality of nozzles simultaneously to obtain a bundle of hollow fiber membranes 210. After coagulation, the hollow fiber membrane bundle may be washed and then wound on a roll.

The hollow fiber membrane 220 according to Comparative Example as shown in FIG. 4 has an outer diameter equal to the outer diameter D of the hollow fiber membrane 210 of FIG. 3, and four channels 222 having inner diameters equal to the inner diameter D2 of the second channel 212 of FIG. 3 are arranged around the center of the hollow fiber membrane 220 in a symmetrical fashion.

In the case in which a membrane humidifier is manufactured using the hollow fiber membranes 220 according to Comparative Example, the humidification performance of the membrane humidifier is maintained constant regardless of the flow rate of the first fluid introduced from the outside. In this case, however, more humidification than necessary is performed even in a low flow rate period which requires low humidification, whereby a flooding phenomenon occurs in the fuel cell stack.

In contrast, in the case in which a membrane humidifier is manufactured using the multi-channel hollow fiber membranes 210 according to the present disclosure, high humidification performance of the multi-channel hollow fiber membranes 210 is maintained in a high flow rate period which requires high humidification and humidification performance thereof is automatically reduced in a low flow rate period which requires low humidification, whereby it is possible to suppress a flooding phenomenon. The reason for this is that, in the case of a low flow rate, the first fluid flows only through the relatively large channels, among the plurality of channels, due to differential pressure and then performs moisture exchange.

Hereinafter, a membrane humidifier having hollow fiber membranes according to Example of the present disclosure will be described by comparing it with Conventional Example and Comparative Example.

Example

A membrane humidifier was manufactured using a bundle of 2500 strands of multi-channel hollow fiber membranes each having an outer diameter of 2300 μm and having four channels of different sizes (Inner diameters: 900 μm, 800 μm, 700 μm, and 600 μm) therein.

Conventional Example

A membrane humidifier was manufactured in the same manner as Example except that 4000 strands of hollow fiber membranes each having only one channel (Inner diameter: 900 μm, Outer diameter: 1100 μm) were used.

Comparative Example

A membrane humidifier was manufactured in the same manner as Example except that 2500 strands of multi-channel hollow fiber membranes each having an outer diameter of 2300 μm and having four channels of the same size (Inner diameter: 800 μm) were used.

Humidification performance of each of the membrane humidifiers according to Example, Conventional Example, and Comparative Example was evaluated as follows, and the results thereof are shown in Table 1 below.

[Humidification Performance Evaluation]

Dry air (Flow rate: 1000 to 4000 sLPM, Temperature: 80° C., Relative humidity: 0 to 5% RH, and Absolute pressure: 1.8 bar) and wet air (Flow rate: 900 to 3600 sLPM, Temperature: 80° C., Relative humidity: 90% RH, and Absolute pressure: 1.6 bar) were supplied through the first fluid inlet and the second fluid inlet of each membrane humidifier in order to perform humidification. The dew point (high flow rate outlet dew point) of humidified air discharged from the membrane humidifier when the flow rate of the dry air was high (4000 sLPM) and the dew point (low flow rate outlet dew point) of humidified air discharged from the membrane humidifier when the flow rate of the dry air was low (1000 sLPM) were measured.

TABLE 1

| | High flow rate outlet dew point (° C.) | Low flow rate outlet dew point (° C.) |
|---|---|---|
| Conventional Example | 50 | 60 |
| Comparative Example | 50.5 | 59 |
| Example | 51 | 39 |

As shown in Table 1, in the case of Conventional Example, the high flow rate outlet dew point was 50° C. and the low flow rate outlet dew point was 60° C.

The fact that the dew point is low means that the humidity is relatively low (i.e. humidification was relatively insufficiently performed).

In the case of Example, the high flow rate outlet dew point was 51° C. and the low flow rate outlet dew point was 39° C. It can be seen therefrom that the humidification performance in the high flow rate period was maintained similar to that of Conventional Example and the humidification performance in the low flow rate period was very low, which is effective in flooding prevention.

In the case of Comparative Example, on the other hand, the high flow rate outlet dew point was 50.5° C. and the low flow rate outlet dew point was 59° C. For Comparative Example, since the sizes of the channels were identical with each other even though the plurality of channels were formed, the outlet dew point in the low flow rate period was similar to that of Conventional Example. It can be seen therefrom that, in the case of Comparative Example, there is little flooding prevention effect in the low flow rate period.

The invention claimed is:

1. A membrane humidifier for a fuel cell, the membrane humidifier comprising:
    a middle case in which a plurality of hollow fiber membranes are accommodated;
    a cap case coupled to the middle case; and
    a fixing unit in which ends of the plurality of hollow fiber membranes are potted, the fixing unit filling gaps between the ends of the hollow fiber membranes and gaps between the hollow fiber membranes and an end of the middle case, thereby blocking the end of the middle case, wherein
    each of the hollow fiber membranes has a plurality of channels including a first channel of maximum inner diameter and a second channel of minimum inner diameter, and
    a difference between the maximum inner diameter and the minimum inner diameter is 30 to 600 μm.

2. The membrane humidifier according to claim 1, wherein each of the hollow fiber membranes has an outer diameter of 1000 to 5000 μm.

3. The membrane humidifier according to claim 2, wherein each of the plurality of channels has an inner diameter of 300 to 1300 μm.

4. The membrane humidifier according to claim 1, wherein shortest distances between an outer circumferential surface of each of the hollow fiber membranes and the channels thereof are 60 to 500 μm.

5. The membrane humidifier according to claim 1, wherein a sum of sectional areas of the plurality of channels of each of the hollow fiber membranes is 40 to 90% of a sectional area of the hollow fiber membrane.

* * * * *